Nov. 16, 1937.   R. E. B. SHARP   2,099,661
STRIP BEARING
Filed April 12, 1934
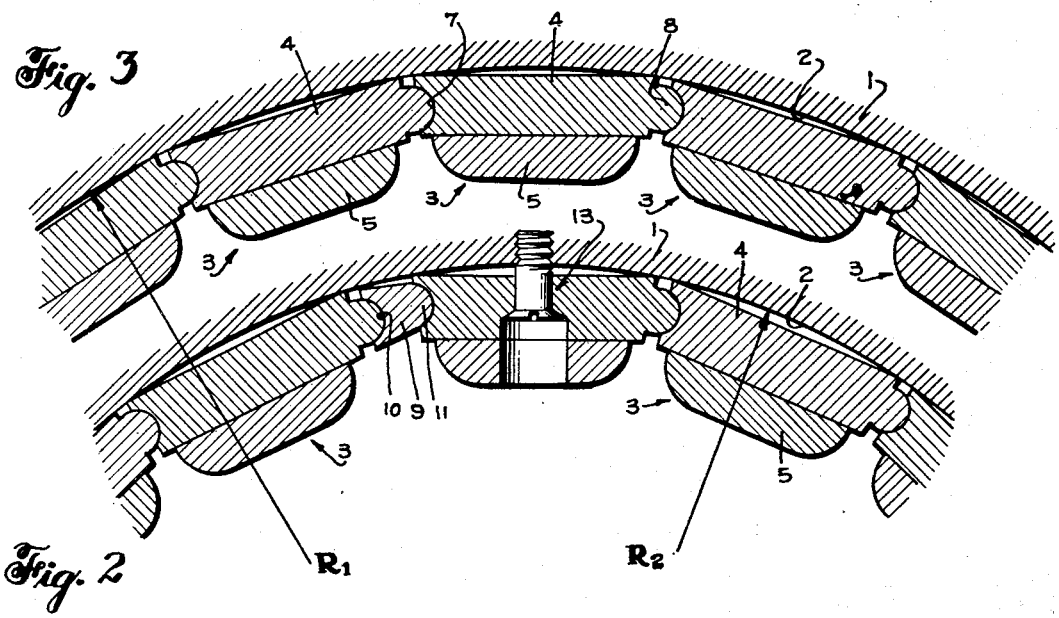
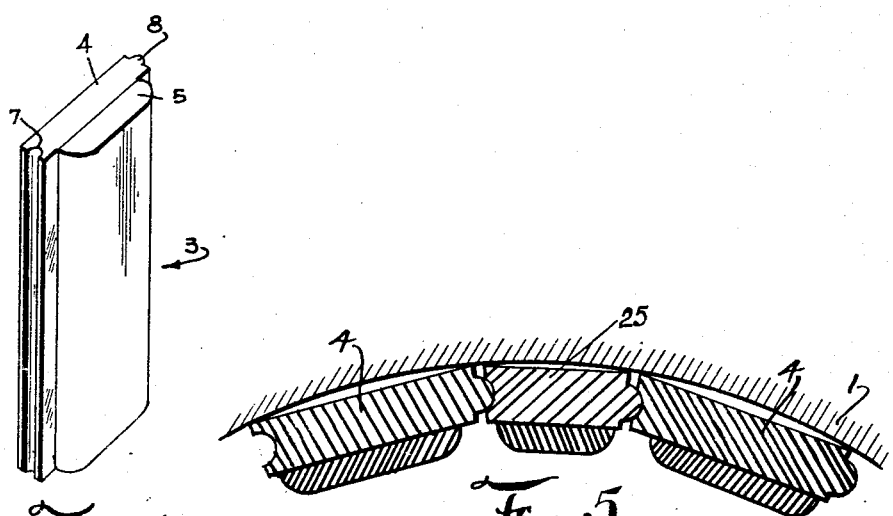
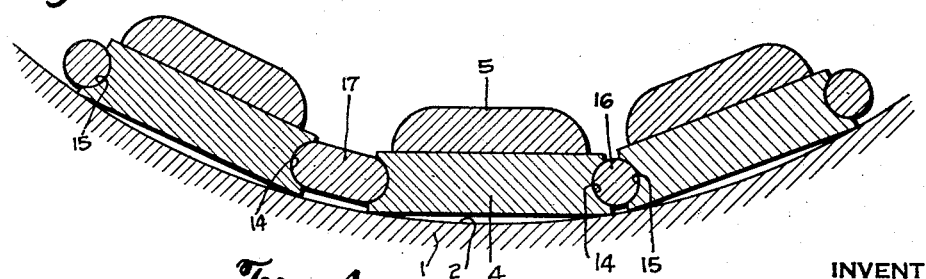
INVENTOR
R.E.B.Sharp
BY
ATTORNEY Patented Nov. 16, 1937

2,099,661

UNITED STATES PATENT OFFICE 2,099,661

STRIP BEARING

Robert E. Brunswick Sharp, Philadelphia, Pa., assignor to Baldwin-Southwark Corporation, a corporation of Delaware Application April 12, 1934, Serial No. 720,196

8 Claims. (Cl. 308—239)

This invention relates generally to so-called strip type bearings and more particularly to an improved method and means whereby a standard bearing strip is adapted to be used for bearings of different diameters.

The bearing herein disclosed relates more particularly to rubber bearings or equivalent material such as is especially adapted for hydraulic apparatus, wherein water is used as a lubricant. Such bearings are widely used in hydraulic turbines and pumps and in the marine field, but the difficulty with such bearings as heretofore constructed is that the strips are adapted for only one diameter, thus necessitating a different size or form of strip for each diameter.

It is one object of my invention to provide an improved strip bearing so constructed and arranged that a standard bearing strip may be employed for a wide range of bearing diameters.

A further object is to provide a standard bearing strip or section having improved means for interlocking the successive strips whereby the same are positively held in position irrespective of the bearing diameter, while at the same time maintaining full effectiveness of the bearing surface and of providing a firm backing for the bearing.

To accomplish certain of the foregoing objects I preferably employ what is herein termed the chordal principle and the interlocking means is preferably in the form of articulated joints whereby the strips are not only adapted to be readily fitted to and positioned to different diameters but will also automatically maintain an equalized operative relation between each other.

A further and more specific object is to provide a bearing formed of my improved standardized strips so arranged that the full circumference of the bearing does not have to be precisely filled with the standard strips but instead an odd space may be left that will not receive a full strip. In one specific aspect of the invention I prefer to accomplish this by providing a filler element interposed between the strips while at the same time maintaining a complete operative relation between all the strips the same as though the standard strips precisely completed the bearing circumference.

Other objects and advantages will be more apparent to those skilled in the art from the following description of the accompanying drawing in which:

Fig. 1 is a perspective view of one form of my improved bearing strip;

Fig. 2 is a horizontal sectional view through a bearing of one diameter embodying my improved bearing;

Fig. 3 is a view similar to Fig. 2 showing the adaptability of the bearing strips of Fig. 2 to a larger diameter bearing;

Fig. 4 is a horizontal section through a bearing embodying a modified form of interlocking means;

Fig. 5 is a modified form of filler.

In the illustrated embodiments of the invention which are shown herein merely for the purpose of disclosing certain specific forms among possible others that the invention might take, I have provided a bearing housing 1 having a circular inner periphery 2 extending axially of a shaft to be journalled in the bearing. The housing 1 may be formed in any suitable manner as part of any suitable apparatus such as a hydraulic turbine, pump, ship, dredge, or other apparatus, but as this does not enter into the present invention, it will suffice to describe only the features of the bearing.

The bearing comprises a plurality of standardized bearing strips 3, each of which comprises preferably a flat heavy metal block 4 preferably but not necessarily of elongated form. The back and front faces of these blocks are flat, whereby the vertical edges of the back normally rest against the circular wall 2 and the back face is spaced therefrom along a chord of the circular wall. Rubber or other suitable composition 5 is vulcanized or otherwise suitably secured to the front face of the block. The rubber facing may be of various shapes to provide suitable lubricant grooves which herein are vertical spaces formed between adjacent edges of the rubber strips. The thickness of the backing plate or block is sufficient to present a rigid backing for the rubber bearing 5 even though the back face of the block is spaced from the circular wall 2.

In order to adapt a single standardized form of bearing strip to a wide range of diameters, while at the same time maintaining the various strips in full interlocking cooperation with each other, I have provided one of the vertical edges of each strip block with a groove 7 while the other vertical edge of the block is provided with a semi-circular tongue 8. This tongue fits within the semi-circular groove 7 of the adjacent bearing strip, and hence it is seen that irrespective of the diameter of the circular wall 2 the bearing strip will readily conform to said wall and at the same time will be held in a fixed position just the same as though the blocks had been specially constructed for the particular diameter of bearing. Inasmuch as the application of the standardized bearing strip to different diameters will likely cause an odd space between the last two bearing strips placed in position, I provide a filler block 9 extending preferably for the full length of the strips and having a concave recess 10 and a circular tongue 11 adapted to cooperate with the tongue and recess of the adjacent strips. This filler will, of course, vary in its circumferential dimension but due to its simplicity and the fact that only one such filler is needed for each diameter of bearing, no particular difficulty will arise from the necessity of using such an element. In fact, the necessity of providing only one such element is far cheaper than the necessity of providing for each diameter of bearing a plurality of special bearing strips as has heretofore been the practice. To suit certain diameters the width of the space between the standard strips may be such that it will be preferable to make a filler 25 by cutting down one of the standard strips as indicated in Fig. 5. The interlocking recess 10 and tongue 11 are preferably of the form shown whereby an articulated self-conforming joint is provided, although in accordance with the interlocking principle disclosed herein the joint may be of various shapes and forms even though non-articulated.

In initially positioning the bearing strips and before the filler 9 is inserted, it is necessary (where the bearing housing is in halves) to hold the bearing strips in each half of the bearing shell or housing, and this is accomplished by having the last strips on each half of the diameter held in position by any suitable screws, generally indicated at 13, threaded in the bearing housing 1 or extending through the housing and threaded into the metal backing of the bearing strip. One end of the strips will butt against a suitable flange around the backing wall 2.

Various arrangements may be provided to obtain the necessary articulated connection between the various bearing strips, although one modification is shown in Fig. 4 wherein both vertical edges of each strip are provided with complementary semi-circular grooves 14 and 15 while a key 16 of circular cross-section is inserted within said recesses to hold the adjacent strip in operative relation. Also a filler element 17 has semi-circular edges so as to be snugly received in the edge grooves of the adjacent strips.

From the foregoing disclosure of the chordal principle, it is seen that a very effective and simple means and method are provided to permit one standard form of strip to be used for a wide range of bearing diameters, such strips herein being referred to as chordal strips.

It will of course be understood that various changes in details of construction and arrangement of parts may be made by those skilled in the art without departing from the spirit of the invention as set forth in the appended claims.

I claim:

1. A bearing comprising a supporting housing having a curved wall, a plurality of strip bearings supported against said wall in partial spaced relation thereto, and means including a complementary projection and recess operatively associated with adjacent bearing strips for interlocking said bearing strips and for allowing the same to be adapted for use in bearings of different diameters while still retaining a normal operative relation to its supporting wall and between the strips.

2. A bearing comprising a supporting housing having a curved wall, a plurality of strip bearings supported at spaced points against said wall but spaced therefrom between the points of support, and articulating means for connecting said bearing strips.

3. A bearing comprising a supporting housing having a curved wall, a plurality of strip bearings supported at spaced points against said wall but spaced therefrom between the points of support, and means for interlocking said strips including a groove in one edge of each strip and a cooperating member disposed within said groove and operatively connected to the adjacent strip.

4. A bearing comprising a supporting housing having a curved wall, a plurality of strip bearings supported at spaced points against said wall but spaced therefrom between the points of support, and means for interlocking adjacent strips including a tongue and groove between the same.

5. A bearing comprising a supporting housing having a curved wall, a plurality of strip bearings supported at spaced points against said wall but spaced therefrom between the points of support, and means for interlocking adjacent strips including a tongue formed along one edge of one strip and a groove formed in the edge of the adjacent strip to receive said tongue.

6. A bearing comprising a supporting housing having a curved wall, a plurality of strip bearings supported at spaced points against said wall but spaced therefrom between the points of support, and means for interlocking adjacent strips including a tongue formed along one edge of one strip and a groove formed in the edge of the adjacent strip to receive said tongue, said tongue and groove being of curved cross-section to permit self-alignment of said strips against said wall.

7. A bearing comprising a supporting housing having a curved wall, a plurality of strip bearings supported at spaced points against said wall but spaced therefrom between the points of support, and means for interlocking adjacent strips including grooves formed in the edges of adjacent strips and a key inserted within said grooves.

8. A bearing comprising a housing having a curved axially extending supporting wall, a plurality of similar bearing strips supported against said wall in at least partially spaced relation thereto and having provision at their adjacent edges whereby said bearing strips may be employed for bearings of different diameters while still being maintained in a normal relation to each other and to the wall, and a filler block adapted to be inserted between two adjacent strips to fill a space not adapted to receive one of said similar strips.

ROBERT E. BRUNSWICK SHARP.